(12) United States Patent
Messner et al.

(10) Patent No.: US 12,246,685 B2
(45) Date of Patent: Mar. 11, 2025

(54) MULTIDISC BRAKE FOR A MOTOR VEHICLE

(71) Applicant: Continental Teves AG & Co. OHG, Frankfurt am Main (DE)

(72) Inventors: Adrian Messner, Mainz (DE); Uwe Bach, Niedernhausen (DE); Jens Hoffmann, Darmstadt (DE); Martin Gädke, Hofheim/Ts. (DE); Matthias Schulitz, Frankfurt am Main (DE); Ahmed Sefo, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 693 days.

(21) Appl. No.: 17/596,231

(22) PCT Filed: May 28, 2020

(86) PCT No.: PCT/EP2020/064804
§ 371 (c)(1),
(2) Date: Jul. 1, 2022

(87) PCT Pub. No.: WO2020/245021
PCT Pub. Date: Dec. 10, 2020

(65) Prior Publication Data
US 2022/0332294 A1    Oct. 20, 2022

(30) Foreign Application Priority Data

Jun. 5, 2019   (DE) .................... 10 2019 208 178.9

(51) Int. Cl.
*B60T 1/06*     (2006.01)
*B60T 13/74*    (2006.01)
(Continued)

(52) U.S. Cl.
CPC ............ *B60T 1/062* (2013.01); *B60T 13/741* (2013.01); *F16D 55/38* (2013.01); *F16D 65/22* (2013.01); *F16D 2125/38* (2013.01)

(58) Field of Classification Search
CPC ..................................... F16D 55/38
See application file for complete search history.

(56) References Cited

U.S. PATENT DOCUMENTS 2,938,607 A * 5/1960 Kershner ................ F16D 55/38
                                                   188/72.8
5,325,949 A    7/1994 Davies
(Continued)

FOREIGN PATENT DOCUMENTS

DE       4224378 A1      1/1993
DE   102010033865 A1 *   4/2011   ............. B60K 17/16
(Continued)

OTHER PUBLICATIONS

DE-102010033865-A1—English Machine translation (Year: 2011).*
(Continued)

*Primary Examiner* — Melanie Torres Williams (57) ABSTRACT

A multi-disk brake for a motor vehicle has two multi-disk mechanisms and an actuation device for brake actuation and/or brake release of the multi-disk mechanisms, and an electric drive for translational actuation (spreading) of the actuation device, such as, in particular, the ramp unit. During a spreading operation, the multi-disk mechanisms are pre-tensioned in a metered manner by the actuation device and produce a desired frictional engagement, and a correspondingly reversed activation of the actuating mechanism enables a correspondingly metered brake release. By means of the electric drive, the action of the multi-disk brake can be metered overall in a particularly precise, sensitive and compensated manner in modern vehicle topology, including (Continued)

all peripheral brake components and systems, including recuperation.

13 Claims, 5 Drawing Sheets

(51) Int. Cl.
*F16D 55/38* (2006.01)
*F16D 65/22* (2006.01)
*F16D 125/38* (2012.01)

(56) References Cited

U.S. PATENT DOCUMENTS

| | | | | |
|---|---|---|---|---|
| 7,958,974 | B2* | 6/2011 | Baumgartner | F16D 65/18 188/73.34 |
| 8,668,057 | B2* | 3/2014 | Kim | F16D 65/18 188/73.1 |
| 2004/0011601 | A1 | 1/2004 | Jakobs | |
| 2006/0118367 | A1 | 6/2006 | Arakawa | |
| 2006/0183591 | A1 | 8/2006 | Krammer | |
| 2012/0073910 | A1 | 3/2012 | Baumgartner | |

FOREIGN PATENT DOCUMENTS

| | | |
|---|---|---|
| DE | 102011007342 A1 | 10/2012 |
| DE | 102011080714 A1 | 12/2012 |
| DE | 102012216662 A1 | 5/2014 |
| DE | 102014200399 A1 | 7/2015 |
| DE | 102016211961 A1 | 1/2018 |
| DE | 102017200399 A | 7/2018 |
| EP | 1000829 A1 | 5/2000 |
| GB | 2034834 A * | 6/1980 ............ F16D 55/48 |
| JP | 2007276725 A | 10/2007 |
| KR | 100369415 B1 | 2/2003 |

OTHER PUBLICATIONS

International Search Report and Written Opinion for PCT application PCT/EP2020/064804, Jul. 21, 2020.

Office Action from German Patent Office, Mar. 5, 2020, for counterpart DE application 10 2019 208 178.9.

Office Action dated Feb. 18, 2024, of the counterpart Chinese Application No. 202080043229.7.

Chinese Second Office Action dated Oct. 12, 2023 for the counterpart Chinese Patent Application No. 202080043229.7 and translation of same.

Chinese Office Action dated Apr. 17, 2023 for the counterpart Chinese Patent Application No. 202080043229.7 and DeepL Translation of same.

Korean Office Action dated Apr. 18, 2023 for the counterpart Korean Patent Application No. 10-2021-7036981 and Global Dossier Translation.

European Search Report dated Jul. 14, 2023 for the counterpart European Patent Application No. 20731408.9.

Decision for Grant of Patent dated May 28, 2024 for the counterpart Korean Patent Application No. 10-2021-7036981 and translation of same.

Examination Report dated Jun. 5, 2024 for the counterpart European Patent Application No. 20 731 408.9 and machine translation of same.

* cited by examiner

MULTIDISC BRAKE FOR A MOTOR VEHICLE

CROSS REFERENCE TO RELATED APPLICATIONS

This application claims priority to PCT Application PCT/EP2020/064804, filed May 28, 2020, which claims priority to German Application DE 10 2019 208 178.9, filed Jun. 5, 2019. The disclosures of the above applications are incorporated herein by reference.

FIELD OF INVENTION

The invention relates to a multi-disk brake for a motor vehicle with a rotatable drive shaft and with a guide device fixed in relation to the drive shaft. The multi-disk brake comprises a multi-disk arrangement, further comprising alternately arranged lining disks and intermediate disks, wherein the lining disks are non-rotatably connected to the drive shaft or to the guide device and the intermediate disks are non-rotatably connected to the respective other component of the guide device or of the drive shaft, and with an actuation device for pretensioning (actuating) and/or releasing the multi-disk arrangement, and with an actuating mechanism/actuator as an actuating drive of the actuation device (brake actuation and/or brake release).

BACKGROUND

Wet multi-disk brakes are already used in agricultural machinery and indus-trial trucks and are known from practice. The multi-disk brake is characterized by a very high brake parameter C*, a constant friction coefficient and an encapsulated design. As a rule, the multi-disk arrangement is arranged in an oil bath such that heat generated during braking can easily be dissipated and, in addition, no brake abrasion passes into the environ-ment. In addition, such a multi-disk brake can be easily integrated in a drive train and can be easily scaled through the size and number of the lining disks and intermediate disks.

In the case of the multi-disk brake known from practice, the actuator is activated by a hydraulic supply in the vehicle. When the multi-disk brake is used in a passenger vehicle, there is also the need to be able to meter the braking power particularly precisely.

SUMMARY

The example embodiments of the present disclosure are based on the problem of developing a multi-disk brake in such a way that, particularly in an electronic motor vehicle brake system that can additionally or separately include one or more electrical and/or hydraulic wheel brakes and/or a plurality of drive trains, such as, in particular, a recuperative brake system, the multi-disk brake can nevertheless be easily activated such that a braking power, such as, in particular, a total braking power of all the brakes or components in cooperation can nevertheless be easily metered.

This problem is solved according to the present disclosure with a particularly simplified metering of the braking power on the basis of the characterizing features of claim 1. The design according to the present disclosure allows the application force or braking power to be metered particularly sensitively and precisely using an electrical control. Furthermore, such an electric drive-in particular a reversible rotary drive—can efficiently drive an actuation device/ramp unit in both directions. This makes it possible to compensate for direction-dependent reinforcement or release effects of a wedge-like ramp device. The electric drive of the actuation device in both directions (brake actuation and/or brake release) enables a constant or regulated braking power as desired with or without the abovementioned compensation measure when driving backward as well as when driving forward. In addition, the inclusion of electrical control technology for peripheral systems and components in modern vehicle topology is made possible to a greater extent (braking cooperation and braking inclusion in a hybridized drive train with integrated regenerative brake). The multi-disk brake is released by driving the actuating mechanism in the brake release direction with a simultaneous corresponding resetting of the multi-disk arrangements by means of at least one return spring.

According to another advantageous development, the metering of the braking power is simplified if the electric drive is in the form of an electric motor with a pivotably mounted pinion which can be driven by the electric motor, and wherein the pinion supports a lever element or cam element. If the lever element or cam element is designed symmetrically, the same braking torque can be generated when driving forward and backward. An asymmetrical cam enables the braking torque to be adapted to different requirements when driving backward and forward.

In a further particular specification of a refinement, the actuation device is designed to a certain extent as a wedge gear, that is, as a ramp device/ramp (construction) unit, and in this context the actuating mechanism/actuator/electric drive can drive this ramp unit even more precisely, and efficiently and reversibly in both directions (brake actuation or brake release), for the purpose of braking force regulation/braking force control. The accordingly correspondingly further developed, sensitive and quickly controlled or regulated drive of the ramp unit in all directions enables a regulated braking performance and/or constant brake actuation sensation, especially in a backward direction of travel as well as in a forward direction of travel. In other words, a further advantageous effect of this improved refinement is that, with a short travel distance, in particular in terms of control technology, very sensitively translated and rapid or translationally converted control interventions on the actuation device/ramp device are made possible. The multi-disk brake is released by resetting the multi-disk arrangement with the aid of one or more return springs, and wherein the actuating mechanism actuates the actuation device/ramp unit in the release direction.

According to another advantageous development, friction losses when the multi-disk brake is actuated can be kept particularly low if the lever element has a roller bearing, and in that the roller bearing faces a control arm of the ramp unit. By reducing the friction between lever element and the ramp unit, the roller bearing increases the efficiency of the multi-disk brake and reduces hysteresis.

According to another advantageous development, the multi-disk brake is particularly compact if the pinion is designed as a toothed segment.

A parking brake customary in motor vehicles can be easily produced, according to another advantageous development, if the electric drive has an activatable parking brake device, and in that the parking brake device either blocks or releases the ramp unit in the position set by the actuator. This parking brake device has a solenoid which holds the pinion in its position or releases its movement.

According to another advantageous development, the parking brake device is structurally particularly simple if the parking brake device has an electromagnetically activatable ratchet wheel, and in that the ratchet wheel meshes with the pinion or the electric drive for either blocking or release.

According to another advantageous development, the activation of the ramp unit is structurally particularly simple if the ramp unit has a rotatable ramp disk supported on the multi-disk pack, in that the ramp disk can be displaced in the axial direction upon rotation, and in that the actuator is designed to rotate the ramp disk.

According to another advantageous development, self-boosting of the braking power of the multi-disk brake can be generated in the same way when driving forward or backward if the ramp unit has two ramp disks arranged between two multi-disk arrangements, and if one ramp disk can be driven in one direction and the other ramp disk in the other direction for the displacement in the axial direction. As a result of this design, depending on the direction of rotation of the shaft, the ramp disk necessary for the self-boosting of the multi-disk brake can be selected and rotated in the same direction of rotation as the adjacent disk of the multi-disk arrangement. This self-boosting leads to an increasing braking torque and thus to an increasing brake parameter C*, as a result of which the required actuating force can be reduced.

The optional drive of one or the other ramp disk depending on the drive direction of the electric drive is particularly simple, according to another advantageous development, if the ramp disks each has a control arm, in that the lever element is arranged between the control arms, and in that the ramp disks of the guide device have support arms which are at a distance opposite one another.

According to another advantageous development, friction losses of the ramp unit can be kept particularly low if the ramp disk has tapering grooves for partially receiving balls. As a result of this design, the balls roll on the edges of the tapering grooves and protrude differently depending on the rotational position of the ramp disk. This produces the axial displacement of the ramp disk.

According to another advantageous development, the multi-disk brake is structurally particularly simple if the guide device is non-rotatably connected to a housing.

According to another advantageous development, the multi-disk brake can be manufactured particularly cost-effectively if the guide device has guide pins fastened in the housing.

According to another advantageous development, cooling of the multi-disk brake is particularly simple if the housing is designed to be open toward a transmission of the motor vehicle. Since the vehicle transmission in motor vehicles has oil lubrication in any case, the oil in the transmission can be provided for cooling the multi-disk brake. This makes the multi-disk brake particularly suitable for use in motor vehicles.

According to another advantageous development, the generation of an intended braking torque when driving forward and backward is particularly simple if the actuator can be activated depending on the direction of rotation of the drive shaft. In this way, one ramp disk can be rotated in one direction of rotation of the drive shaft and the other ramp disk in the other direction of rotation.

BRIEF DESCRIPTION OF THE DRAWINGS

The invention permits numerous embodiments. To further illustrate its basic principle, one of these embodiments is illustrated in the drawing and will be described in the following text. In the drawing.

DETAILED DESCRIPTION

Figure 1:
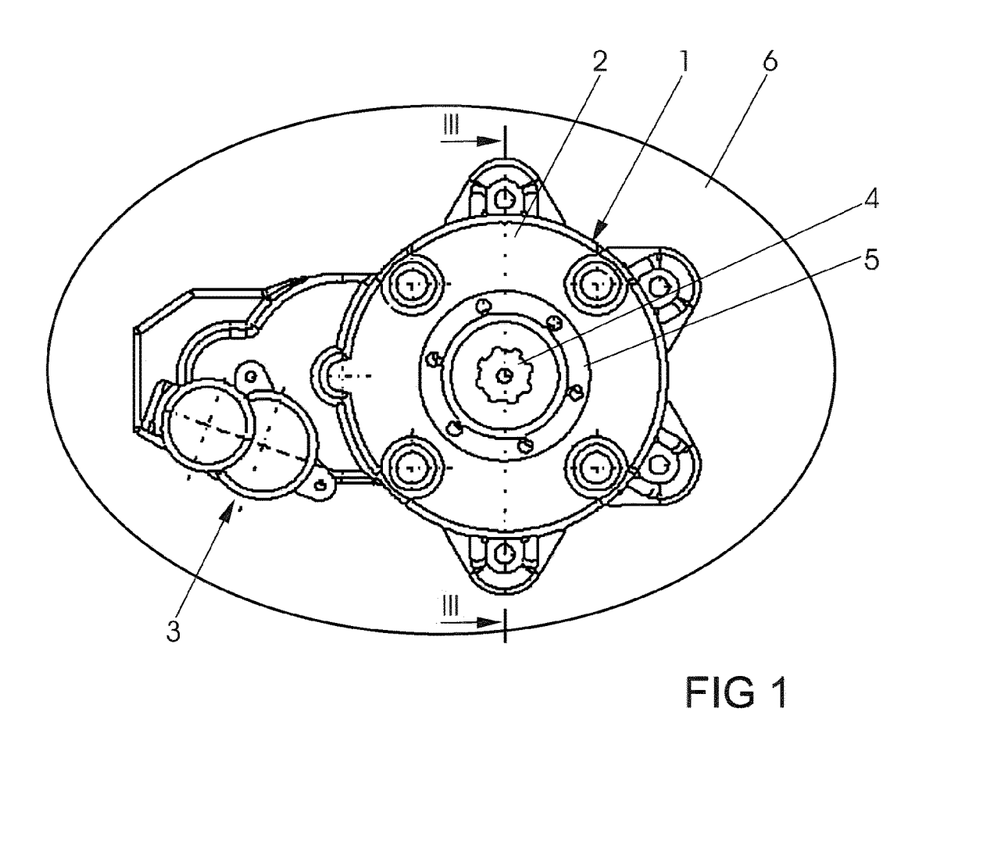
FIG. 1 shows a front view of a multi-disk brake fastened to a transmission.

FIG. 1 shows a multi-disk brake 1 with a housing 2, with an actuating mechanism, i.e. an actuator 3, as the actuating mechanism, and with a flange 5, which is non-rotatably arranged on a drive shaft 4, for connecting a drive train, not illustrated, of a motor vehicle. The housing 2 of the multi-disk brake 1 is fastened to a schematically illustrated transmission 6 of a motor vehicle.

Figure 2:
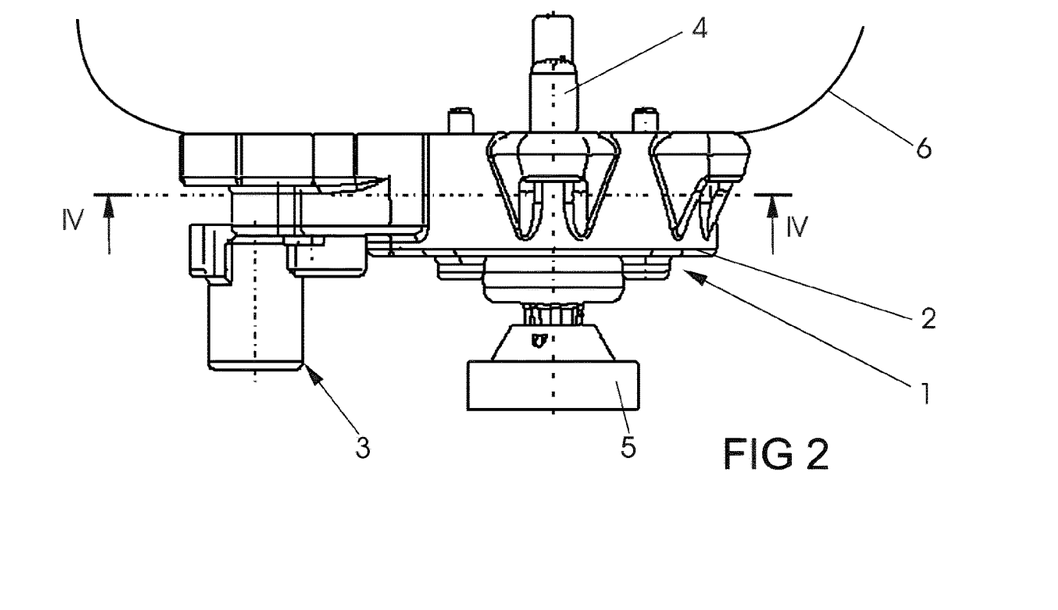
FIG. 2 shows a top view of the multi-disk brake from FIG. 1.

FIG. 2 shows the multi-disk brake 1 from FIG. 1 in a top view with a partial region of the transmission 6. The drive shaft 4 can be connected to a transmission output shaft (not illustrated) of the transmission 6. The housing 2 of the multi-disk brake 1 is open toward the transmission 6 such that a lubricant circuit of the transmission 6 reaches the multi-disk brake 1 and lubricates and cools the latter.

Figure 3:
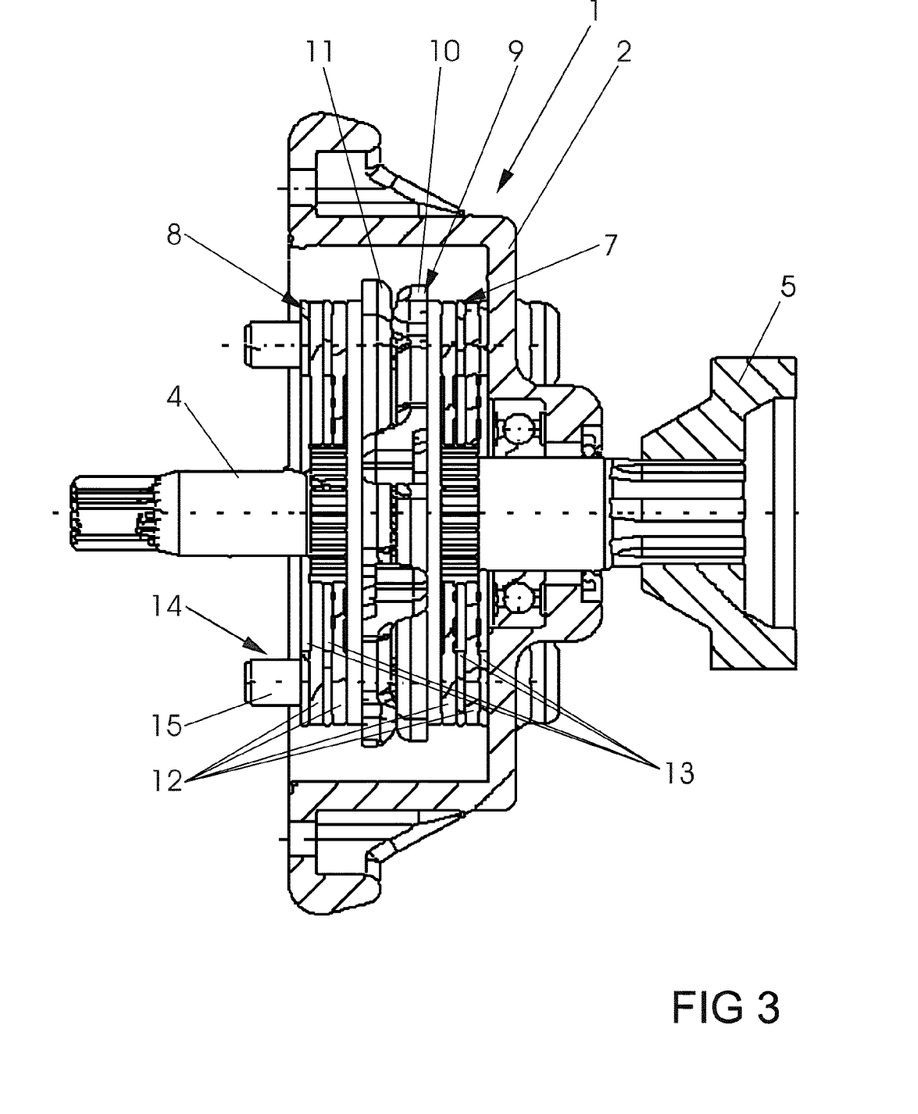
FIG. 3 shows a sectional illustration through the multi-disk brake from FIG. 1 along the line III-III.

FIG. 3 shows, in a sectional illustration through the multi-disk brake 1 from FIG. 1 along the line III-III, that the multi-disk brake 1 has two multi-disk arrangements 7, 8 and, between the multi-disk arrangements 7, 8, an actuation device in the form of a ramp unit 9 with two ramp disks 10, 11. The multi-disk arrangements 7, 8 alternately have lining disks 12 and intermediate disks 13. The lining disks 12 are arranged non-rotatably and axially displaceably on the drive shaft 4, while the intermediate disks 13 are arranged non-rotatably and axially displaceably on a guide device 14. The guide device 14 has guide pins 15 fastened in the housing 2. The axial mobility of the lining disks 12 and the intermediate disks 13 is limited by the housing 2 and the guide device 14.

During the braking operation, the ramp disks 10, 11 of this actuation device are rotated relative to one another. The ramp disks 10, 11 move axially apart and press the multi-disk arrangements 7, 8 together. These cause a frictional engagement between the drive shaft 4 rotatable by the transmission 6 and the guide device 14 fixed to the housing 2.

Figure 4:
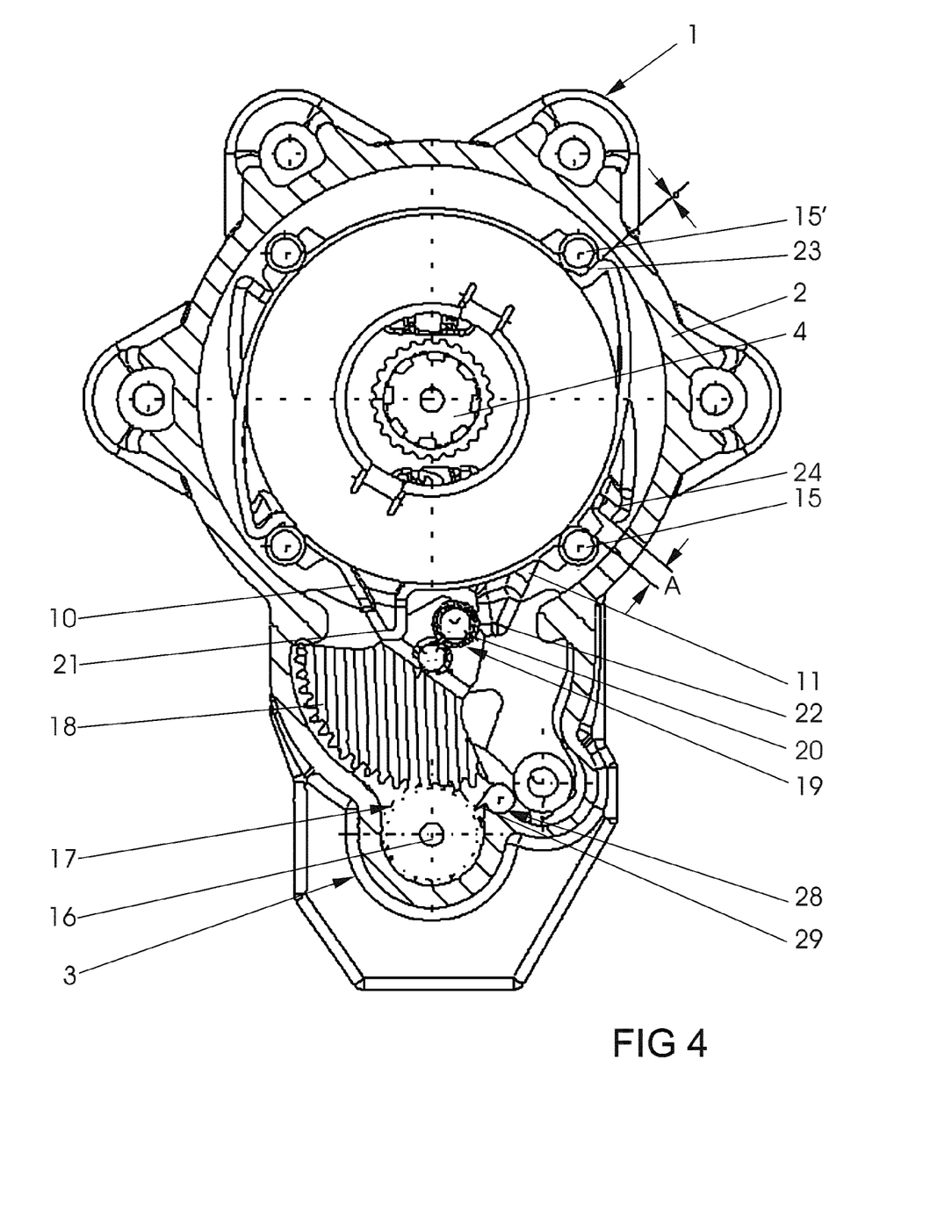
FIG. 4 shows a sectional illustration through the multi-disk brake from FIG. 2 along the line IV-IV.

FIG. 4 shows, in a sectional illustration along the line IV-IV from FIG. 2 through the central region of the multi-disk brake 1, the connection of the adjusting mechanism/actuator 3 to the actuation device/ramp unit 9. The adjusting mechanism/the actuator 3 has an electric drive 16 with an actuator gear 17. The actuator gear 17 has a pinion 18 designed as a toothed segment with a lever element 19. The lever element 19 carries a roller bearing 20 and is arranged between control arms 21, 22 of the two ramp disks 10, 11. Furthermore, the ramp disks 10, 11 have support arms 23, 24 with which they face the guide pins 15. When the pinion 18 is driven by the electric drive 16, the lever element 19 is deflected to one of the control arms 22, as a result of which the associated ramp disk 11 is rotated. As a result, the support arm 24 of this ramp disk 11 is at a large distance A from the next guide pin 15. The other ramp disk 10 is supported with the support arm 23 on the next guide pin 15'.

In a further embodiment, not illustrated, the lever element 19 is designed as a control cam and is arranged on an axis of rotation of the pinion 18.

Figure 5:
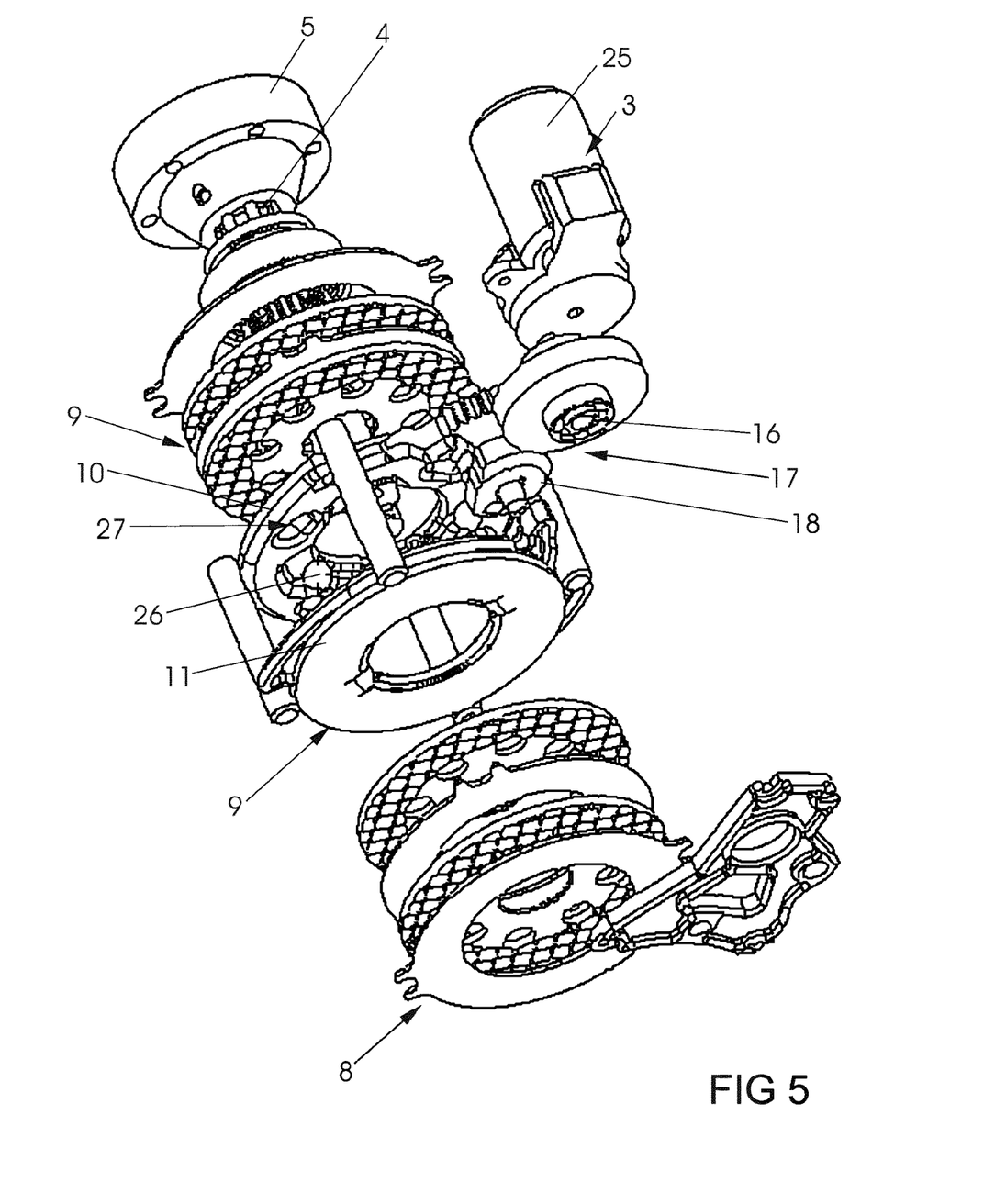
FIG. 5 shows an exploded illustration of some components of the multi-disk brake from FIG. 1.

FIG. 5 shows some components of the multi-disk brake 1 in an exploded illustration. It can be seen here that the electrical actuating mechanism/electric drive has an electric motor 25. The actuator gear 17 is arranged between the electric motor 25 and the pinion 18 having the lever element 19. Balls 26 which are guided in tapering grooves 27 of the ramp disks 10, 11 are arranged between the ramp disks 10, 11. The grooves 27 are aligned tangentially to the direction of rotation of the ramp disks 10, 11. As a result of the tapering, the balls 26 are moved out axially with respect to one another depending on the rotational position of the ramp disks 10, 11, and the ramp disks 10, 11 are thus spread apart.

Return springs for releasing the pretensioning/actuation of the multi-disk arrangements 7, 8 when the actuator 3 is not energized are not illustrated, in order to simplify the drawing. Such return springs are fastened to the ramp disks 10, 11 and press these ramp disks 10, 11 against the balls 26 arranged between them.

Figure 6:
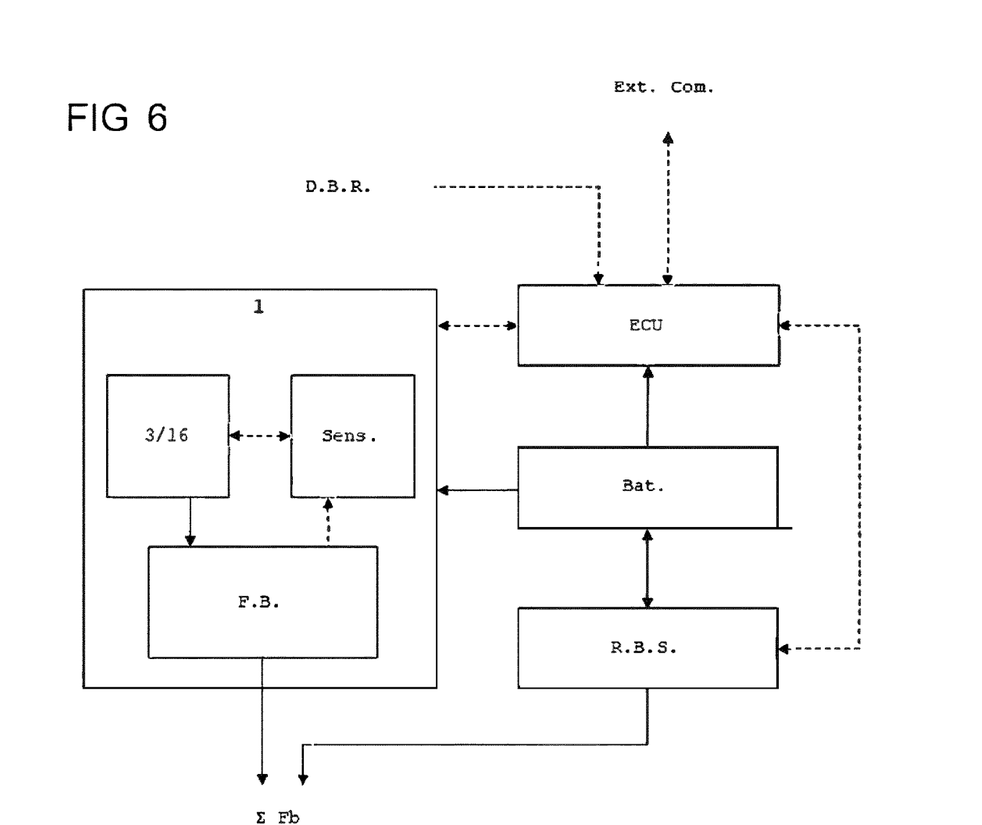
FIG. 6 shows a schematic diagram of the system.

FIG. 6 shows a sufficiently self-explanatory, schematic brake/drive train system relationship with regard to the mechatronic system which the present invention in-corporates in a particularly advantageous manner. A friction brake F.B in the form of the multi-disk brake 1 cooperates and communicates with a recuperatively acting drive (brake) train (R.B.S) for the purpose of generating a total braking force effect ΣFb, which is made up additively of a frictional braking force component and a recuperative (drive) braking force component. Merely for the sake of clarification, it should also be added that an electromechanically actuable multi-disk brake, as is shown structurally by way of example as a solution proposal with reference to FIGS. 1-5, in principle is not intended to or does not have to include an implicit release functionality. This is because a multi-disk brake is not readily automatically put in a position to be released automatically or currentlessly after the brake has been actuated. Rather, it is primarily provided that a release force is applied externally, separately, on the basis of one or more pretensioned return springs. Accordingly, there is by no means necessarily a rigid coupling in the brake release direction between the ramp disk 10, 11 and the drive 16.

1 Multi-disk brake
2 Housing
3 Actuator
4 Drive shaft
5 Flange
6 Transmission
7 Multi-disk arrangement
8 Multi-disk arrangement
9 Ramp unit
10 Ramp disk
11 Ramp disk
12 Lining disk
13 Intermediate disk
14 Guide device
15 Guide pin
16 electr. drive
17 Actuator gear
18 Pinion
19 Lever gear
20 Roller bearing
21 Control arm
22 Control arm
23 Support arm
24 Support arm
25 Electric motor
26 Ball
27 Groove
Bat. Power supply (e.g. accumulator/battery/PowerCap)
D.B.R. (Driver Brake Request)=driver brake actuation/brake release
ECU electronic (brake) control unit
Ext. Com. cross-system, external communication/data bus
F.B. Friction brake
R.B.S. recuperative (drive)/braking system
S (brake) load measuring device
ΣFb Total braking force
- - - - Signal flow
_________ Flow of energy

The invention claimed is:

1. A multi-disk brake for a motor vehicle with a rotatable drive shaft and with a guide device fixed in relation to the drive shaft, a multi-disk arrangement/multi-disk pack comprising alternately arranged lining disks and with intermediate disks, wherein the lining disks are non-rotatably connected to the drive shaft or to the guide device and the intermediate disks are non-rotatably connected to the respective other of the guide device or the drive shaft, further comprising an actuation device, for actuating/pretensioning the multi-disk arrangement/multi-disk pack and with an actuating mechanism/actuator for actuating and/or releasing the actuation device, wherein the actuating mechanism/actuator has an electric drive;

wherein the electric drive has an electric motor with a pivotably mounted pinion which is driven by the electric motor and the pinion supports a lever element or cam element; and wherein the actuation device comprises a ramp unit, the lever element or cam element comprises the lever element, and the lever element has a roller bearing, and the roller bearing faces a control arm of the ramp unit.

2. The multi-disk brake as claimed in claim 1, wherein the electric drive is configured as a rotationally reversible rotary drive with a rotating shaft.

3. The multi-disk brake as claimed in claim 1, wherein the pinion is configured as a toothed segment.

4. The multi-disk brake as claimed in claim 1, wherein the electric drive has an activatable parking brake device, the actuation device comprises a ramp unit, and the parking brake device either blocks or releases the ramp unit in a position set by the actuating mechanism/actuator.

5. The multi-disk brake as claimed in claim 4, wherein the parking brake device has an electromagnetically activatable ratchet wheel, and the ratchet wheel meshes with the pinion or the electric drive.

6. The multi-disk brake as claimed in claim 1, wherein the actuation device is in the form of a ramp unit and has a rotatable ramp disk supported on the multi-disk arrangement/multi-disk pack, the ramp disk is displaced in the axial direction upon rotation depending on rotational position, and the actuating mechanism/actuator is configured to rotate the ramp disk.

7. The multi-disk brake as claimed in claim 6, wherein the multi-disk arrangement/multi-disk pack comprises two multi-disk packs, the ramp unit has two ramp disks arranged between the two multi-disk packs, and one ramp disk is driven in one direction and the other ramp disk in the other direction for the displacement in the axial direction.

8. The multi-disk brake as claimed in claim 7, wherein the lever element or cam element comprises the lever element, the ramp disks each has a control arm, the lever element is arranged between the control arms, and the ramp disks of the guide device have support arms which are at a distance opposite one another.

9. The multi-disk brake as claimed in claim 6, wherein the ramp disk has tapering grooves for partially receiving balls.

10. The multi-disk brake as claimed in claim 1, wherein the guide device is non-rotatably connected to a housing.

11. The multi-disk brake as claimed in claim 10, wherein the guide device has guide pins fastened in the housing.

12. The multi-disk brake as claimed in claim 10, wherein the housing is configured to be open toward a transmission of the motor vehicle when connected therein.

13. The multi-disk brake as claimed in claim 1, wherein the actuating mechanism/actuator is activated depending on a direction of rotation of the drive shaft.

* * * * *